US009793520B2

(12) United States Patent
Knapp et al.

(10) Patent No.: US 9,793,520 B2
(45) Date of Patent: Oct. 17, 2017

(54) FLEXIBLE FOLDING BATTERY COVER

(71) Applicant: Carcoustics TechConsult GmbH, Leverkusen (DE)

(72) Inventors: Rainer Knapp, Oxford, MI (US); Gerald Fitzgerald, Clinton Township, MI (US); Axel Boehme, Rochester, MI (US); Graydon Stuckey, Fenton, MI (US); Tony Rasegan, Webberville, MI (US); Lucero Guzman Gaytan, Shelby Township, MI (US); Eric Stuckey, Fenton, MI (US)

(73) Assignee: Carcoustics TechConsult GmbH, Leverkusen (DE)

( * ) Notice: Subject to any disclaimer, the term of this patent is extended or adjusted under 35 U.S.C. 154(b) by 590 days.

(21) Appl. No.: 14/169,726

(22) Filed: Jan. 31, 2014

(65) Prior Publication Data
US 2015/0221899 A1    Aug. 6, 2015

(51) Int. Cl.
*H01M 2/02* (2006.01)
*H01M 2/06* (2006.01)
(Continued)

(52) U.S. Cl.
CPC ............ *H01M 2/024* (2013.01); *B31B 50/14* (2017.08); *H01M 2/0262* (2013.01);
(Continued)

(58) Field of Classification Search
CPC .... B31B 2203/08; B31B 3/14; H01M 2/0262; H01M 2/0287; H01M 2/043;
(Continued)

(56) References Cited

U.S. PATENT DOCUMENTS

| 3,825,447 A | 7/1974 | Kraals | |
|---|---|---|---|
| 2003/0146126 A1* | 8/2003 | Kanter | B65D 5/001 206/503 |

(Continued)

FOREIGN PATENT DOCUMENTS

| CN | 201673950 | * 12/2010 | .......... H01M 10/617 |
| CN | 201673950 U | 12/2010 | |

OTHER PUBLICATIONS

Wu et. al., "A solution for folding rigid tall shopping bags", Proceedings of the Royal Society A. (published online Mar. 30, 2011).

*Primary Examiner* — Jonathan G Leong
*Assistant Examiner* — Seenam Agbetiafan
(74) *Attorney, Agent, or Firm* — Young Basile Hanlon & MacFarlane, P.C.

(57) ABSTRACT

Battery covers and methods for producing battery covers are described. One battery cover described herein includes a single sheet of material formed into a substantially rectangular box shape with an opening formed along one side, the rectangular box shape capable of being folded into a flattened shape for transportation and the material including a flexible laminate of at least one layer of synthetic fiber and a polymer film layer. The material has a thickness and other properties such that when the battery cover is unfolded, the material substantially maintains the rectangular box shape, and when the battery cover is folded into the flattened shape, the material maintains a spring force such that, unless restrained, the battery cover would unfold to the rectangular box shape.

20 Claims, 7 Drawing Sheets

(51) Int. Cl.
*H01M 2/04* (2006.01)
*H01M 2/10* (2006.01)
*B31B 50/14* (2017.01)
*B31B 100/00* (2017.01)

(52) U.S. Cl.
CPC ......... *H01M 2/0287* (2013.01); *H01M 2/043* (2013.01); *H01M 2/0482* (2013.01); *H01M 2/06* (2013.01); *H01M 2/1083* (2013.01); *H01M 2/1094* (2013.01); *B31B 2100/00* (2017.08); *B31B 2100/002* (2017.08)

(58) Field of Classification Search
CPC .... H01M 2/0482; H01M 2/06; H01M 2/1083; H01M 2/1094
See application file for complete search history.

(56) References Cited

U.S. PATENT DOCUMENTS

| | | | |
|---|---|---|---|
| 2004/0043289 A1* | 3/2004 | Shimamura | H01M 2/0212 429/162 |
| 2005/0014061 A1 | 1/2005 | Ahn | |
| 2007/0009794 A1* | 1/2007 | Takami | H01M 2/021 429/184 |
| 2007/0029321 A1* | 2/2007 | Palley | B65D 88/14 220/88.1 |
| 2011/0135221 A1* | 6/2011 | Bashir | B29C 55/06 383/6 |

* cited by examiner

FLEXIBLE FOLDING BATTERY COVER

FIELD OF THE DISCLOSURE

The present disclosure relates generally to a vehicle battery cover.

BACKGROUND

Automotive and marine batteries traditionally comprise an anode plate, a cathode plate, and an isolation plate in the interior of a cell casing, and are often lead acid batteries. The battery is charged to a certain threshold by a generator, and discharged as power demand of the automobile increases. Such chemical operations are repeated throughout the battery's lifetime. Temperature of the battery components can have a great effect on these repeated cycles, thus impacting the efficiency and durability of the components.

BRIEF SUMMARY

Battery life decreases when the battery is exposed to extreme high temperatures that can be present near a motor vehicle engine or exhaust system. This disclosure describes a flexible and foldable battery cover that, among other benefits, reduces the transfer of heat to battery components. The disclosures herein can provide cost effective, lightweight and aesthetically pleasing battery covers. Furthermore, the battery covers disclosed herein are foldable to a folded shape that allows for easy and cost-effective transportation and can spring back into an open shape for installation.

One embodiment of the flexible battery cover comprises a single sheet of material formed into a substantially rectangular box shape with an opening formed along one side. The cover is configured to be able to fold into a flattened shape for transportation. The material includes a layer of a thermoplastic polymer resin and a layer of polymer film. The battery cover has a thickness such that when the battery cover is unfolded, the material substantially maintains the rectangular box shape and when the battery cover is folded into the flattened shape, the material maintains a spring force such that, unless restrained, the battery cover would unfold to the rectangular box shape. Each fold line of the battery cover can comprise a series of perforations in the material.

A method of manufacturing a flexible and foldable battery cover in accordance with the present disclosure is also described herein. According to one method, material is cut from a single sheet, where the material includes a flexible laminate of a layer of synthetic fiber and a layer of polymer film. The single cut sheet of material forms a substantially rectangular box shape with an opening formed along one side. The material has a thickness such that when the battery cover is unfolded, the material substantially maintains the rectangular box shape and when the battery cover is folded into the flattened shape, the material maintains a spring force. The spring force when folded is such that, unless restrained, the battery cover would unfold to the rectangular box shape.

Variations in these and other aspects of the disclosure will be described in additional detail hereafter.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
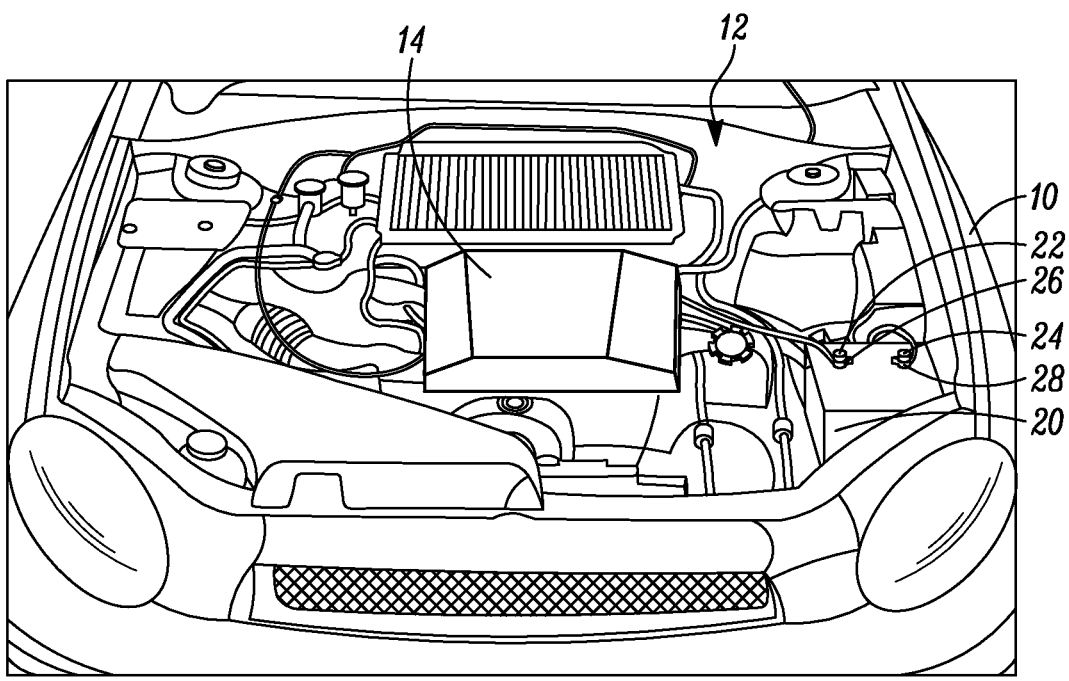
FIG. 1 is a perspective view of a typical motor vehicle engine bay and battery location.

Referring first to FIG. 1, engine bay 12 of representative vehicle 10 is shown. Engine 14 (and related engine components) is shown in approximately the center of engine bay 12. Battery 20 is shown in engine bay 12, located near engine 14. As shown, battery 20 comprises positive electrode 22 and negative electrode 24. Positive terminal connector 26 and negative terminal connector 28 are connected to positive and negative electrodes 22, 24 to carry electrical current that is to be distributed where required in the automobile. While battery 20 is shown in FIG. 1 in close proximity to engine 14, it is contemplated that the location of battery 20 can vary depending on particular application, including areas within engine bay 12, a passenger compartment, or the vehicle trunk. Because of the extreme conditions of the environment where battery 20 is located in a vehicle, battery cover 30 as further described can help to isolate and protect battery 20.

Figure 2:
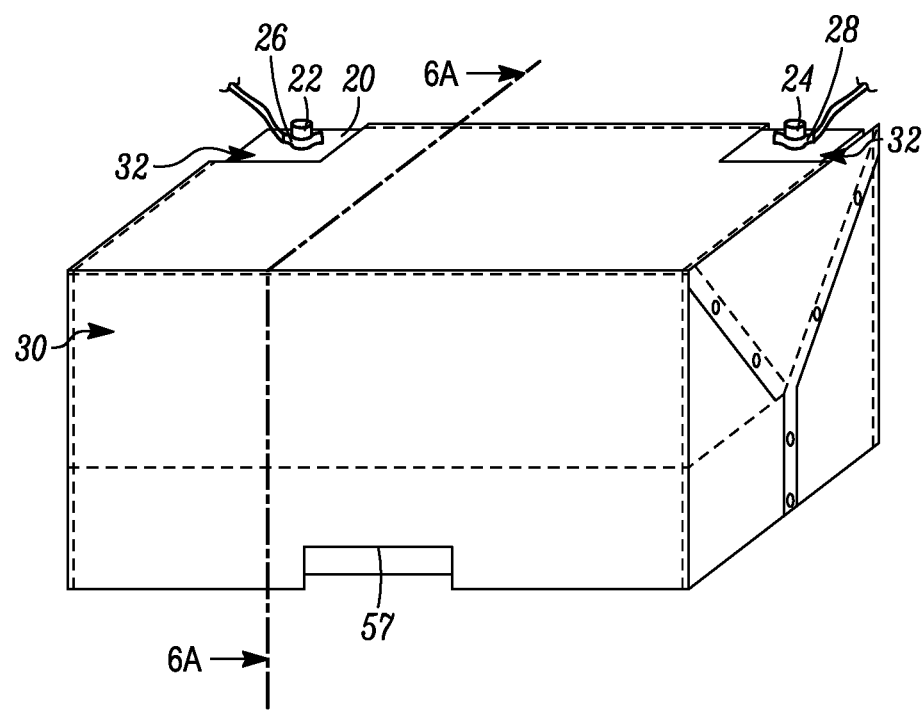
FIG. 2 is an isometric view of a battery with a battery cover according to an implementation of the teachings herein shown in representative installed position.

FIG. 2 shows battery cover 30 installed over battery 20, wherein battery cover 30 is positioned over and on battery 20 such that the four walls and top of battery cover 30 are in close proximity or in contact with the four walls and top of battery 20. As such, battery cover 30 is formed as a substantially rectangular box shape with an open surface, here the bottom surface. As evident in FIG. 2, battery cover 30 can define terminal openings 32 to expose positive and negative electrodes 22, 24 of battery 20. This allows for attachment and removal of terminal connectors 26 and 28 while battery cover 30 is in an installed position. While terminal openings 32 are depicted as being square in shape and located at two of the corners of the top of battery cover 30, other shapes, sizes, and locations are contemplated. For example, terminal openings 32 could be located on the long front or rear peripheral surface to correspond to positive and negative electrodes 22, 24 mounted on a similar peripheral surface of battery 20. Terminal openings 32 could also be located on different surfaces of battery cover 30 to correspond to the placement of positive and negative electrodes 22, 24 of battery 20.

A slot 57 or other shaped cut-outs near the open surface of battery cover 30 may be present to allow for clearance of other vehicle components when battery 20 and battery cover 30 are installed in vehicle 10. Furthermore, battery cover 30 is shown to extend past the bottom of battery 20 in the installed position, but it is contemplated that any or all of the front, back or side walls can terminate at a location above the bottom surface of battery 20 for installation or clearance issues. While battery cover 30 is depicted as having an open surface on the bottom, the open surface could be any surface of battery cover 30 that would allow it to be slipped over a battery while allowing the folding described below and corresponding terminal openings 32 to positive and negative electrodes 22, 24.

Figure 3:
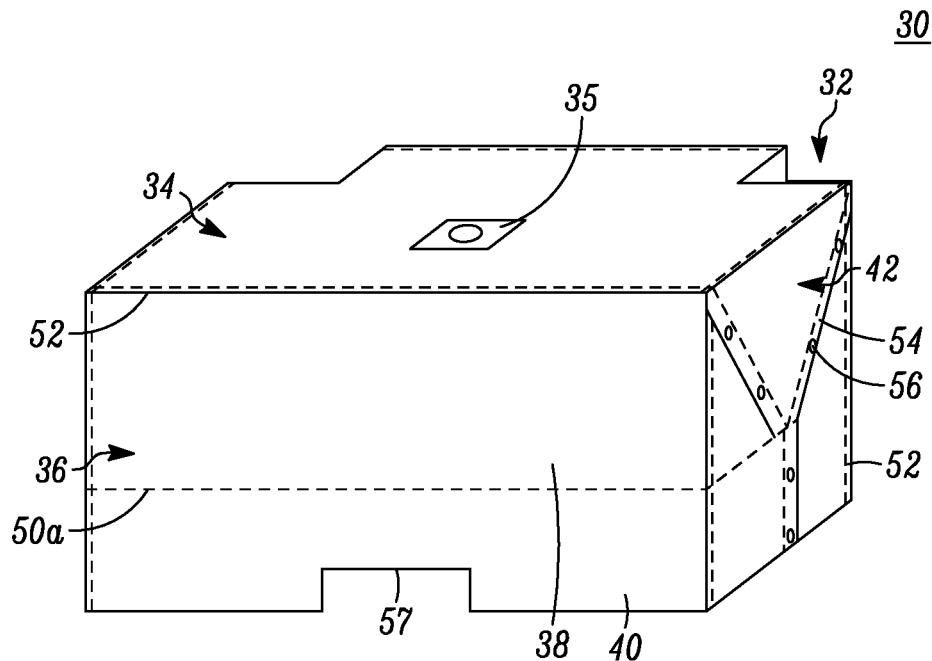
FIG. 3 is an isometric view of a battery cover according to an implementation of the teachings herein.
Figure 4:
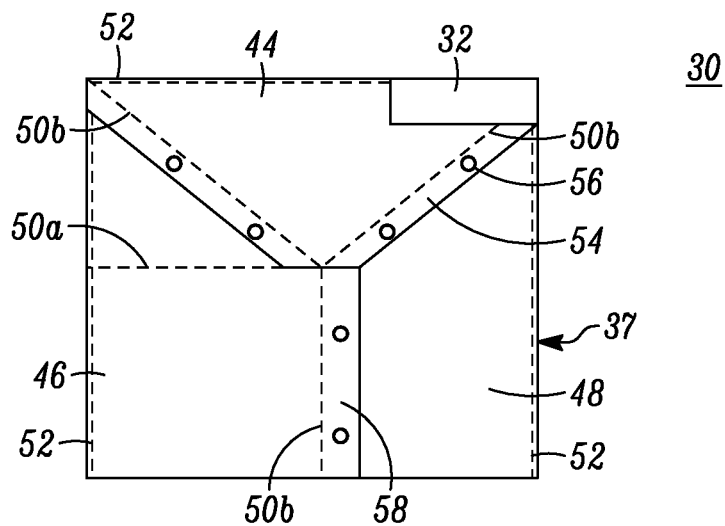
FIG. 4 is a side view the battery cover of FIG. 3.

FIGS. 3 and 4 show battery cover 30 in an unfolded, fully constructed state. This is the state in which battery cover 30 would be mounted on a battery, such as battery 20. Battery cover 30 as shown has a substantially rectangular box shape with an open bottom surface. The rectangular box shape may also be referred to as a five-sided rectangular box shape or a rectangular box shape with an opening in place of one surface. Battery cover 30 includes front wall 36, back wall 37 that opposes front wall 36, top wall 34 and left and right side walls 42. While only right side wall 42 is shown in FIGS. 3 and 4, its opposing left side wall 42 is a mirror image of right side wall 42, including all elements located thereon. With further reference to FIG. 3, battery cover 30 can include a label 35 on top wall 34 to provide helpful instructions or warnings to an end user of the vehicle. Battery cover 30 is not limited to a rectangular box shape and could comprise a roughly cubic box shape.

Battery cover 30 can include a number of perforations. Desirably, perforations are located at all locations where battery cover 30 is folded into the rectangular box shape or is to be folded into its folded configuration. Corner perforations 52 are located along the corners of the fully constructed battery cover 30. Corner perforations 52 allow battery cover 30 to have approximately right angles where front, back, top and side walls 36, 37, 34 and 42 meet when constructed from one piece of material as described later. Folding perforations 50a, 50b are located on front side 36 and side walls 42 and, along with corner perforations 52, allow for battery cover 30 to be manipulated into a folded configuration, in which battery cover 30 can occupy less volume in a shipping container. Folding perforations 50b on side walls 42 act as a hinge that allows side walls 42 to be collapsed inward during folding. Folding perforation 50a in front wall 36 divides front wall 36 into a first front wall portion 38 located between top wall 34 and folding perforation 50a, and a second front wall portion 40 located between folding perforation 50a and the open bottom surface of batter cover 30. When in the folded configuration (see FIG. 7), front wall 36 and side walls 42 are creased along folding perforations 50a, 50b, and top, front, back and side walls 34, 36, 37 and 42 can rotate relative to one another along corner perforations 52.

Figure 5:
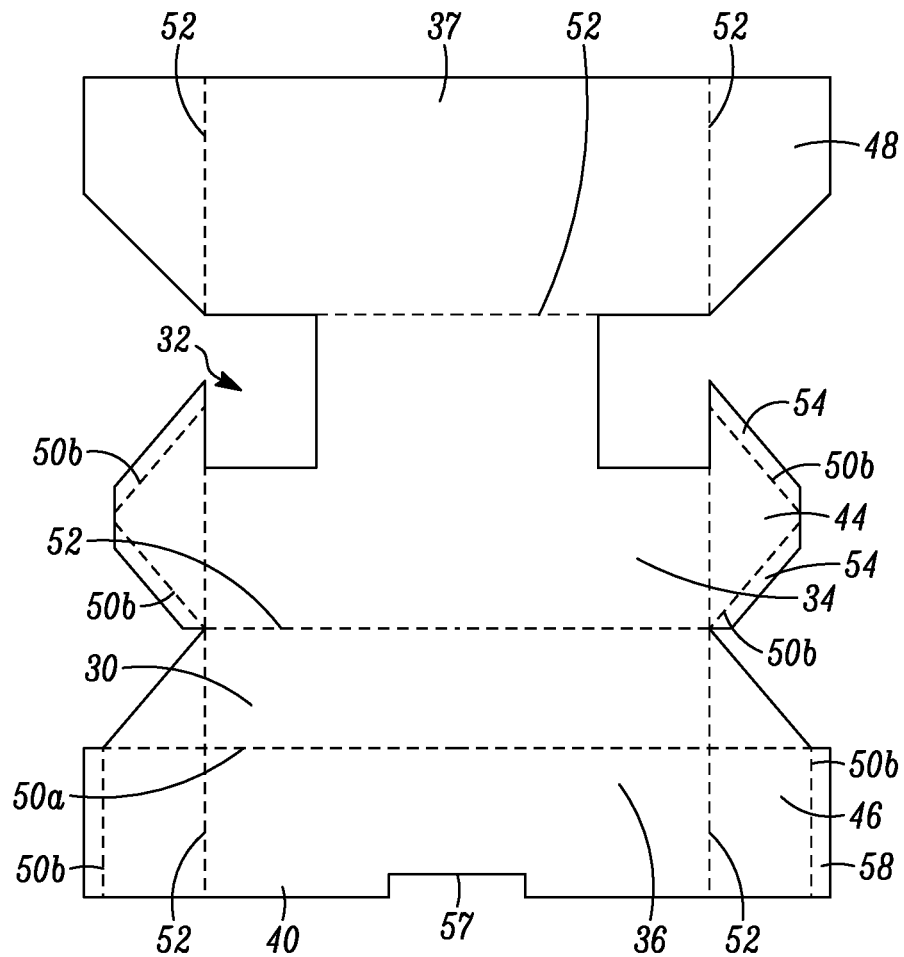
FIG. 5 is a top view of a starting sheet for construction of the battery cover of FIG. 3.

As mentioned, it is desirable that battery cover 30 be constructed out of one piece of material. Referring to FIG. 5, battery cover 30 is shown in a non-constructed state of one flat sheet of material before the material is manipulated to form its constructed state shown in FIGS. 2-4. It is contemplated that battery cover 30 can be cut from sheets of the layered material using a die cutting process, but other methods of cutting or trimming the material may be used. With continued reference to FIG. 5, perforations 50a, 50b, 52 can be created using a die cutting or stamping process while battery cover 30 is still in the substantially flat or non-constructed state. Perforations 50a, 50b, 52 can be created as part of the cutting process, or as a prior or subsequent step. A die can include a cutting structure to trim the outside edges of battery cover 30, and it may have perforation structure that is configured to compress or cut through the material of battery cover 30. Corner perforations 52 and folding perforations 50 can be created to be similar in size and depth as described herein, but it is contemplated that the perforations of battery cover 30 can vary in size and depth. Note that it is possible in accordance with the teachings herein to construct battery cover 30 out of more than one piece of material. However, this adds to the processing steps to form battery cover 30 and may make battery cover 30 more bulky when in its folded configuration due to the need to join the separate pieces of material. This is less desirable than using a single sheet of material.

Once battery cover 30 is cut and perforations 50a, 50b, 52 made, battery cover 30 can be bent along corner perforations 52 to create the desired shape of the constructed battery cover. As shown in FIGS. 4 and 5, side walls 42 can comprise first side portion 44, second side portion 46 and third side portion 48. Each of the first, second and third side portions 44, 46, 48 is fixedly attached to the other two side portions to cause battery cover 30 to retain the constructed state. The three side portions can be connected by overlaying first portion tabs 54 of top wall 34 over the second side portion 46 and third side portion 48 of side walls 42 and by overlaying second portion tab 58 of front wall 36 over third side portion 48 of side walls 42. Tabs 54, 58 can be attached to side portions 46, 48 via an ultrasonic welding process, as well as other conventional fastening means such as adhesives, clips, staples, etc. In the ultrasonic welding process, ultrasonic acoustic vibrations of approximately 20 to 30 kilohertz (kHz) are applied locally to the material under pressure to create a solid-state weld. No connective bolts, nails soldering materials, or adhesives are necessary, saving both cost and weight. Referring back to FIGS. 3 and 4, weld spots 56 are shown on side walls 42, where the ultrasonic welding was localized and produced a welded bond between the two layered sheets of material. A total of six weld spots 56 are depicted on each side wall 42, but it is contemplated that the size and number of welds may vary upon application. While the embodiments described herein have the attachment and overlapping portions of material on opposing short sides of the rectangular box shape, it is contemplated that the material can be cut in such a way that the attachments are located on other opposing walls of the rectangular box shape, such as front wall 36 and back wall 37.

Figure 6:
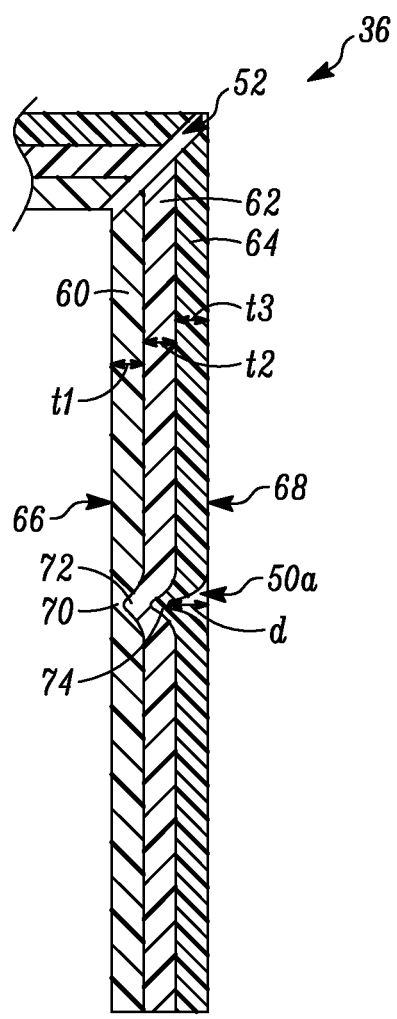
FIG. 6 is a partial sectional view of one side of a battery cover as seen from substantially the line 6A-6A of FIG. 2.

Turning to FIG. 6, the internal composition of the material of battery cover 30 is further described. FIG. 6 is a partial cross sectional view of front wall 36, as substantially viewed from line 6A-6A of FIG. 2. As mentioned previously, battery cover 30 can preferably be constructed out of a laminate sheet material. In this implementation, the laminate sheet material of battery cover 30 comprises at least two different materials laminated together. Inner layer 60 is the layer of material that is closest to the interior of the constructed battery cover 30, and includes inner surface 66 that contacts or is positioned in close proximity to battery 20 when battery cover 30 is in the installed position of FIG. 2. Inner layer 60 can comprise a synthetic fibrous material, and in particular a polyethylene terephthalate (PET) fiber material. Other polymer fibers can be used, such as polyester or polypropylene, with a goal of providing a completely recyclable finished product. Inner layer 60 provides a relatively poor path for heat conduction to occur through the many packed fibers and is thus a good insulator.

The thickness of inner layer 60 can vary depending on the application, but it is contemplated that thickness t1 of a PET fiber inner layer can be less than 1 mm thick. Similarly, the density of inner layer 60 can vary based upon application. In certain embodiments, a PET fiber with an area or paper density of 355 grams per square meter (gsm) can be used.

Battery cover 30 further includes a film layer 62, which is located directly to the outside of inner layer 60. The material of film layer 62 can be a polymeric film, and more specifically a polyethylene (PE) film. Thickness t2 of film layer 62 can vary, but can be less than 1 mm. The density of the PE film of film layer 62 can be approximately 145 gsm. Film layer 62 is less porous than the PET fiber of inner layer 60 and can provide protection from convective heat transfer by limiting or preventing air flow (e.g., from the radiator) through battery cover 30.

Battery cover 30 can optionally include outer layer 64, which is located further outside from both the inner layer 60 and film layer 62. Outer layer 64 includes outer surface 68 of battery cover 30. Similar to inner layer 60, outer layer 64 can comprise a synthetic fibrous material, and in particular a PET fiber. Fibrous outer layer 64 can add additional thermal and physical protection of battery 20, as well as provide an aesthetically pleasing outer surface 68. The thickness of outer layer 64 can also vary depending on the application, but it is contemplated that a thickness of a PET fiber outer layer can be up to 1 mm in an implementation where outer layer 64 is not needed for thermal protection. Outer layer 64 can have an area density of approximately 100 gsm, but other densities of the PET fiber are contemplated.

The PET fiber of inner layer 60 and outer layer 64 coupled with the PE film of film layer 62 can provide thermal protection to limit both conductive and convective heat transfer through battery cover 30. The PET fiber of battery cover 30 can have hydrophobic characteristics, wherein inner layer 60 and outer layer 64 are water repellant and fluid resistant. This reduces or eliminates any weight increase due to water absorption and reduces drying time of battery cover 30. Additionally, the PET fiber and PE film can add protection against impact to battery 20 from debris.

The perforations of battery cover 30 can be further explained with reference to FIG. 6. Perforations are shown as indents into the battery cover 30 with a depth distance d. As mentioned above, this can be accomplished by a stamping process wherein the die would include a series of protruding structures designed to either compress certain areas along a perforation line, or cut into the material along a perforation line (either partially or fully through the material). If the material is compressed in areas along perforation lines, this can result in compressed inner portion 70, compressed film portion 72 and compressed outer portion 74 directly inside of folding perforation 50a as shown in FIG. 6. If the die cuts through the material along perforation lines, then there would be a corresponding series of gaps or voids of the material such as that shown for corner perforation 52 in FIG. 6.

It is contemplated that the optimal composition and thickness of the layers of the material, along with the desired attributes of the perforation lines can be determined using computer-aided or real-world testing. For example, computer modeling of the heat transfer in the location of the battery 20 can help determine the type and amount of material for adequate protection.

Figure 7A:
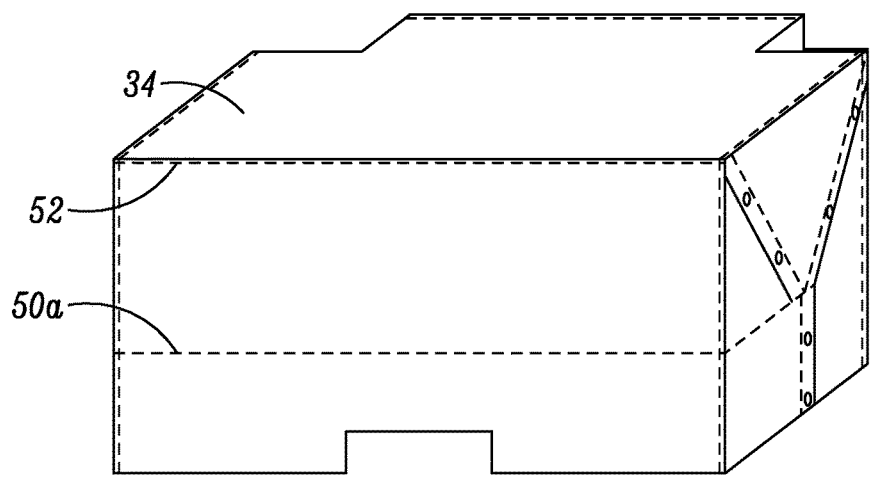
FIG. 7A is an isometric view of a battery cover in an unfolded state.
Figure 7B:
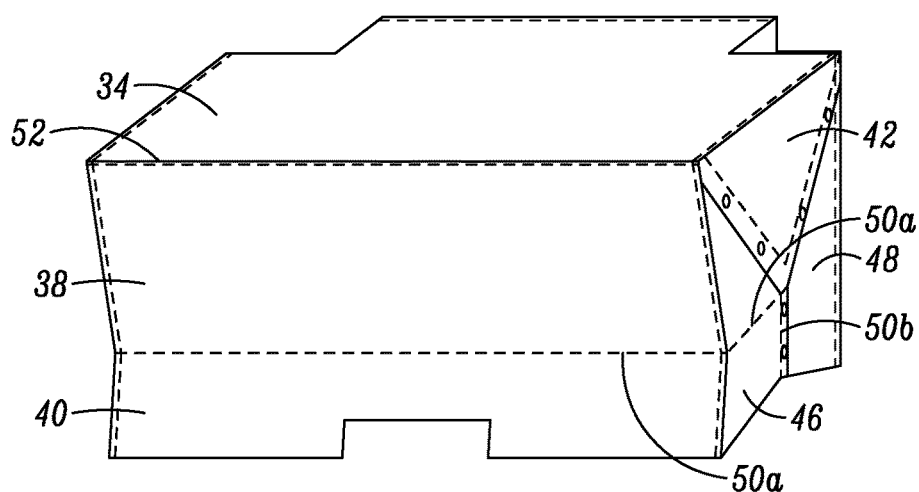
FIG. 7B is an isometric view of a battery cover in a partially folded state.
Figure 7C:
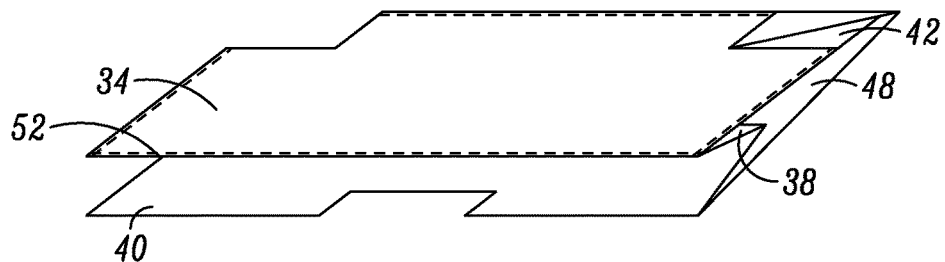
FIG. 7C is an isometric view of a battery cover in a folded state.

FIGS. 7A-7C show the ability of battery cover 30 to be manipulated from a non-folded state in FIG. 7A to a folded state in FIG. 7C. By folding battery cover 30, it allows for more efficient storage and shipping of battery covers 30. Folded battery covers occupy less space such that a higher volume of battery covers can be folded and placed in shipping containers. As made clear in FIGS. 7B and 7C, the battery cover can be folded along folding perforations 50a, 50b in both the front wall 36 and side walls 42. During the folding process, the hinges formed by folding perforations 50b in side walls 42 permit the midpoints of walls 42 to travel in a direction towards an inside of battery cover 30. First front wall portion 38 and second front wall portion 40 fold relative to each other along folding perforation 50a. In addition, each of the front, back, top and side walls 36, 37, 34 and 42 can fold in relation to each other along corner perforations 52. In the folded position of FIG. 7C, top wall 34, first front wall portion 38, second front wall portion 40 and back wall 37 are all in a substantially parallel position.

Due to a combination in the thickness, resiliency and other properties of the material comprising battery cover 30, battery cover 30 maintains a spring force to bias the battery cover 30 into the unfolded, rectangular box shape of FIG. 7A. That is, while battery cover 30 is in the unfolded state, the material substantially maintains the unfolded rectangular box shape, and when battery cover 30 is in a folded state, battery cover 30 will unfold to form the rectangular box shape unless restrained in the folded position. This springing effect causes battery cover 30 to unfold into the rectangular box shape after removing any restraint, such as removing it from between adjacent folded battery covers in a full shipping or storage container. This unfolding action can save time in installation of battery cover 30 by reducing the manipulation needed by an installer.

Figure 8:
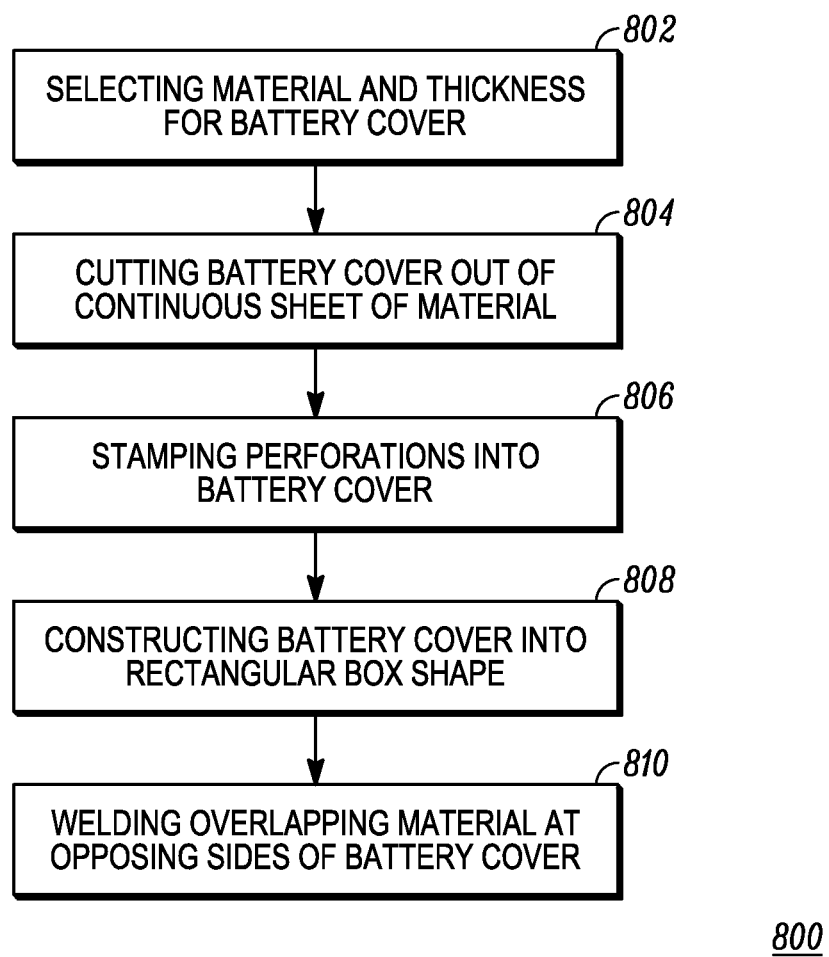
FIG. 8 is a flowchart diagram of a method of manufacturing a battery cover according to an implementation of the teachings herein.

A method for manufacturing battery cover 30 can be described as follows, and for simplicity of explanation, illustrated in flow diagram FIG. 8 as process 800. However, steps in accordance with this disclosure can occur in various orders and/or concurrently. Additionally, steps in accordance with this disclosure may occur with other steps not presented and described herein. Furthermore, not all illustrated steps may be required to implement a method in accordance with the disclosed subject matter.

As shown in step 802, material properties are selected based on the particular application and location of battery 20. In step 804, a blank sheet of the selected laminate material that is large enough to provide a cut-out of battery cover 30 in one continuous piece is cut to the required size and shape. As described, the cutting process can be accomplished using a die cutting or stamping process. Perforations are die stamped into the sheet in step 806, and as mentioned above, perforations can be stamped contemporaneously with the die cutting process. To generate perforations, the die can compress or cut through the material of battery cover 30.

In step 808, battery cover 30 is constructed into the rectangular box shape described above. In accomplishing this, battery cover 30 is bent into approximately right angles at corner perforations 52 where any two walls meet. Side walls 42 are constructed with first side portion 44, second side portion 46, and third side portion 48 each overlapping the other two. In step 810, overlapping portions of each of the side portions are ultrasonic welded to each other as described above.

It is to be noted that battery cover 30 can be attached to battery 20 and/or vehicle 10 in a variety of ways. Battery cover 30 can be installed over battery 20 and held in place with frictional and gravitational forces, or with additional fastening means. It is also contemplated that the terminal connectors and/or wiring can aid in retaining battery cover 30.

While the embodiments described herein have a total of three distinct sub-layers of battery cover 30, it is further contemplated that only one layer of PET fiber be utilized.

For example, outer layer 64 could be omitted and battery cover 30 could comprise inner layer 60 and film layer 62.

While the invention has been described in connection with certain embodiments, it is to be understood that the invention is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A flexible and foldable battery cover, comprising:
    a single sheet of material formed into a substantially rectangular box shape with an opening formed along one side, the rectangular box shape capable of being folded into a flattened shape for transportation along multiple fold lines, and the material including a flexible laminate of a layer of synthetic fiber and a layer of polymer film in contact with the layer of synthetic fiber, the material having characteristics such that:
    when the battery cover is unfolded, the material substantially maintains the rectangular box shape; and
    when the battery cover is folded into the flattened shape, the material maintains a spring force at the multiple fold lines such that, unless restrained, the battery cover would unfold to the rectangular box shape.

2. The battery cover of claim 1, wherein the multiple fold lines comprise opposite-end fold lines located on opposite end surfaces of the rectangular box shape, wherein the opposite-end fold lines form hinges that respectively collapse inward during folding of the rectangular box shape.

3. The battery cover of claim 1, wherein each fold line of the multiple fold lines comprises a series of perforations in the material.

4. The battery cover of claim 1, further comprising:
    two electrode openings through a surface of the battery cover opposite to the opening, each of the two electrode openings located on opposing corners along a long edge of the surface.

5. The battery cover of claim 2 wherein the opposite end surfaces are located along short edges of the rectangular shape and comprise overlapping pieces of the single sheet.

6. The battery cover of claim 5 wherein the overlapping pieces are ultrasonic welded to each other.

7. The battery cover of claim 1 mounted on a battery, wherein the opening is at a bottom surface of the rectangular box shape and a height from a top surface of the rectangular prism shape to the bottom surface is shorter than a height of the battery.

8. The battery cover of claim 7 wherein terminals of the battery extend outside of respective electrode openings in a surface of the rectangular box shape.

9. The battery cover of claim 1 wherein the synthetic fiber is polyethylene terephthalate and the polymer film is a polyethylene film.

10. The battery cover of claim 9 wherein the polyethylene terephthalate has an area density of 335 grams per square meter.

11. The battery cover of claim 9 wherein the polyethylene film has an area density of approximately 145 grams per square meter.

12. A flexible and foldable vehicle battery cover, comprising:
    a single sheet of material formed into a substantially rectangular box shape with one side comprising an opening; and
    multiple fold lines including opposite-end fold lines forming a respective hinge on opposite end surfaces of the rectangular box shape, the opposite-end fold lines joining at a respective common point and each adjacent to overlapping pieces of the single sheet, wherein the rectangular box shape is foldable into a flattened shape for transportation, and the material including a flexible laminate of a layer of synthetic fiber and a layer of polymer film, the material having characteristics such that:
    when the vehicle battery cover is unfolded, the material substantially maintains the rectangular box shape; and
    when the vehicle battery cover is folded into the flattened shape, the material maintains a spring force at the multiple fold lines such that, unless restrained, the vehicle battery cover would unfold to the rectangular box shape.

13. The vehicle battery cover of claim 12, wherein the multiple fold lines comprise a divider fold line dividing a front surface and at least a portion of the opposite end surfaces respectively into first portions located on one side of the divider fold line and second portions located on the other side of the divider fold line, wherein the first portions are adjacent to the opening.

14. A method for producing a flexible and foldable battery cover, the method comprising:
    cutting material from a single sheet, the material including a flexible laminate of a layer of synthetic fiber and a layer of polymer film in contact with the layer of synthetic fiber; and
    forming a substantially rectangular box shape with an opening formed along one side using the single sheet of material, the rectangular box shape capable of being folded into a flattened shape for transportation along multiple fold lines, and wherein the material has characteristics such that:
    when the battery cover is in the rectangular box shape, the material substantially maintains the rectangular box shape; and
    when the battery cover is folded into the flattened shape, the material maintains a spring force at the multiple fold lines such that, unless restrained, the battery cover would unfold to the rectangular box shape.

15. The method of claim 14 wherein the cutting comprises a die cutting process.

16. The method of claim 14 further comprising:
    stamping a series of perforations in the material along each fold line of the battery cover.

17. The method of claim 14 wherein the forming comprises bending the material at approximately 90 degree angles along eight edges of the rectangular box shape and attaching overlapping pieces of the material together at opposing sides of the rectangular box shape.

18. The method of claim 17 wherein the attaching comprises ultrasonic welding.

19. The method of claim 14 wherein the cutting produces terminal openings and the forming results in the terminal openings on opposing corners of a surface of the battery cover along a long edge of the rectangular box shape.

20. The method of claim 14 wherein the synthetic fiber is polyethylene terephthalate, and the polymer film is a polyethylene film.

* * * * *